US011806808B2

United States Patent
Vierstraete

(10) Patent No.: US 11,806,808 B2
(45) Date of Patent: Nov. 7, 2023

(54) METHOD FOR BUTT LASER WELDING TWO METAL SHEETS

(71) Applicant: ArcelorMittal, Luxembourg (LU)

(72) Inventor: René Vierstraete, Maisons-Laffitte (FR)

(73) Assignee: ARCELORMITTAL, Luxembourg (LU)

( * ) Notice: Subject to any disclaimer, the term of this patent is extended or adjusted under 35 U.S.C. 154(b) by 40 days.

(21) Appl. No.: 16/958,405

(22) PCT Filed: Dec. 19, 2018

(86) PCT No.: PCT/IB2018/060367
§ 371 (c)(1),
(2) Date: Jun. 26, 2020

(87) PCT Pub. No.: WO2019/130169
PCT Pub. Date: Jul. 4, 2019

(65) Prior Publication Data
US 2021/0053152 A1 Feb. 25, 2021

(30) Foreign Application Priority Data

Dec. 26, 2016 (WO) .................. PCT/IB2017/058402

(51) Int. Cl.
*B23K 26/24* (2014.01)
*B23K 26/06* (2014.01)
(Continued)

(52) U.S. Cl.
CPC ............ *B23K 26/24* (2013.01); *B23K 1/0056* (2013.01); *B23K 26/0604* (2013.01);
(Continued)

(58) Field of Classification Search
CPC ............ B23K 26/0604; B23K 26/0608; B23K 26/0676; B23K 26/24; B23K 1/0056;
(Continued)

(56) References Cited

U.S. PATENT DOCUMENTS 4,691,093 A * 9/1987 Banas .................. B23K 15/004
219/121.64
4,914,268 A * 4/1990 Hixon ................ B23K 15/0053
219/121.14
(Continued)

FOREIGN PATENT DOCUMENTS

CN 102059452 B * 4/2014
DE 102015112537 A1 1/2017
(Continued)

OTHER PUBLICATIONS

Machine English Translation of JP-2002219590-A (Year: 2002).*
(Continued)

*Primary Examiner* — Sang Y Paik
*Assistant Examiner* — Erwin J Wunderlich
(74) *Attorney, Agent, or Firm* — Davidson, Davidson & Kappel, LLC

(57) ABSTRACT

A method for butt laser welding two metal sheets includes providing a first metal sheet and a second metal sheet and butt welding the metal sheets along a direction of welding. The butt welding step includes simultaneously generating a first front keyhole in the first metal sheet, generating a second front keyhole in the second metal sheet, and generating a back keyhole in the first and second metal sheets. The first and second front laser beams and the back laser beam are configured in such a manner that at each moment in time, a solid phase region and/or a liquid phase region of the metal sheets remains between the first front keyhole and the back keyhole and between the second front keyhole and the back keyhole.

36 Claims, 4 Drawing Sheets

(51) Int. Cl.
- *B23K 26/073* (2006.01)
- *B23K 26/322* (2014.01)
- *B23K 1/005* (2006.01)
- *B23K 26/242* (2014.01)
- *B23K 101/18* (2006.01)
- *B23K 103/04* (2006.01)

(52) U.S. Cl.
CPC ........ *B23K 26/0608* (2013.01); *B23K 26/073* (2013.01); *B23K 26/0734* (2013.01); *B23K 26/242* (2015.10); *B23K 26/322* (2013.01); *B23K 2101/18* (2018.08); *B23K 2103/04* (2018.08)

(58) Field of Classification Search
CPC .......................... B23K 26/073; B23K 26/0734; B23K 26/322; B23K 2101/18; B23K 2103/04; B23K 26/242
USPC .................................................... 219/121.64
See application file for complete search history.

(56) References Cited

U.S. PATENT DOCUMENTS

| | | | | |
|---|---|---|---|---|
| 6,207,929 | B1* | 3/2001 | Stava | B23K 9/092 219/130.51 |
| 8,253,061 | B2* | 8/2012 | Nowak | B23K 26/26 219/136 |
| 8,946,586 | B2* | 2/2015 | Bea | B23K 26/0734 219/121.64 |
| 8,993,920 | B2* | 3/2015 | Yano | B23K 13/046 219/121.64 |
| 9,677,692 | B2* | 6/2017 | Yano | F16L 9/02 |
| 11,065,718 | B2* | 7/2021 | Tateyama | B23K 26/211 |
| 11,148,226 | B2* | 10/2021 | Yang | B23K 26/22 |
| 2004/0099644 | A1* | 5/2004 | Allen | C21D 9/50 219/121.64 |
| 2005/0028897 | A1* | 2/2005 | Kurz | B23K 26/0604 148/525 |
| 2008/0116175 | A1* | 5/2008 | Ballerini | B23K 26/24 219/121.64 |
| 2009/0085254 | A1 | 4/2009 | Abramov et al. | |
| 2012/0006795 | A1* | 1/2012 | Nowak | B23K 26/0604 219/121.64 |
| 2013/0309000 | A1* | 11/2013 | Lin | B23K 26/0652 219/121.64 |
| 2014/0175069 | A1* | 6/2014 | Yano | B23K 26/0608 219/121.64 |
| 2014/0263191 | A1* | 9/2014 | Zapata | B23K 26/38 219/121.72 |
| 2015/0224597 | A1 | 8/2015 | Olsen | |
| 2016/0250717 | A1* | 9/2016 | Kruger | B23K 26/0006 219/76.1 |
| 2017/0173734 | A1 | 6/2017 | Evangelista et al. | |
| 2017/0304943 | A1 | 10/2017 | Tsukui | |
| 2019/0118297 | A1 | 4/2019 | Abramov et al. | |
| 2020/0156185 | A1* | 5/2020 | Vila I Ferrer | B23K 26/211 |

FOREIGN PATENT DOCUMENTS

| | | | | |
|---|---|---|---|---|
| EP | 2942143 | B1 | 3/2017 | |
| JP | H0890265 | A | 4/1996 | |
| JP | H0890265 | A | 4/1996 | |
| JP | H1158060 | A | 3/1999 | |
| JP | 2002219590 | A * | 8/2002 | ......... B23K 26/0622 |
| JP | 2003340582 | A | 12/2003 | |
| JP | 2003340582 | A | 12/2003 | |
| JP | 2004090069 | A | 3/2004 | |
| JP | 2010508149 | A | 3/2010 | |
| JP | 101733553 | A | 6/2010 | |
| JP | 2012110905 | A | 6/2012 | |
| JP | 2012130946 | A | 7/2012 | |
| JP | 103056523 | A | 4/2013 | |
| JP | 103862178 | A | 6/2014 | |
| JP | 106573339 | A | 4/2017 | |
| JP | 2017529694 | A | 10/2017 | |
| KR | 1020100082787 | | 7/2010 | |
| KR | 20150138964 | A | 12/2015 | |
| WO | WO2009045319 | A2 | 4/2009 | |
| WO | WO-2016025701 | A * | 2/2016 | ......... B23K 26/0622 |
| WO | WO2016025701 | A1 | 2/2016 | |
| WO | WO2016200621 | A2 | 12/2016 | |
| WO | WO2017103149 | A1 | 6/2017 | |

OTHER PUBLICATIONS

Machine English Translation of WO-2016025701-A1 (Year: 2016).*
Strang, Gilbert, "Linear Algebra and its Applications," Jan. 2006, Cengage Learning, 4th ed., p. 174 (Year: 2006).*
Machine English Translation of CN-102059452-B (Year: 2014).*
Search Report for PCT/IB2018/060367.
Search Report for PCT/IB2017/058402.

* cited by examiner

METHOD FOR BUTT LASER WELDING TWO METAL SHEETS

The present invention relates to a method for butt laser welding two metal sheets.

The metal sheets used for welding are generally obtained by cutting from metal strips or larger metal sheets using cutting methods such as slitting, shearing, press cutting, laser cutting or water jet cutting.

BACKGROUND

These cutting methods typically create an edge profile with a relief or clearance angle, which results in a gap between the metal sheets when these metal sheets are arranged edge to edge in view of butt welding. This gap may result in the absence of contact over the entire length of the edge over at least a portion of the thickness of the metal sheets or in the absence of contact at only some points of the facing edges of the metal sheets. This initial gap may be further widened due to the deformations of the metal sheets resulting from the thermal stresses during the welding process itself.

In some cases, for example if a welding material is to be added to the weld bath, it may further desirable to impose and maintain a minimum welding gap between the sheets. In this case, the welding gap typically extends over the entire thickness and length of the facing edges of the metal sheets, such that there is no contact between the two metal sheets that are to be welded to one another.

The inventor of the present invention has found that the conventional laser welding methods using a standard laser beam are not entirely satisfactory for butt welding together such metal sheets due to the presence of this gap between the metal sheets. Indeed, an important part of the energy of the laser beam is wasted since it passes through the gap and therefore does not interact with the sheets. In fact, the inventor has observed that, typically, only 10% to 20% of the energy of the laser beam is actually used to weld the sheets, while the remaining 80 to 90% is wasted.

WO 2017/103149 is concerned with the problem of obtaining a weld joint having uniform material properties between two metal sheets having a zinc-alloy or an aluminum-alloy precoating. For this purpose, WO 2017/103149 discloses a method for butt laser welding two such metal sheets using a filler wire and three laser beams, a first laser beam being intended for melting the filler wire, and two further laser beams being intended for melting the metal sheets and for mixing the created weld pool. As can be seen in FIG. 1c, the three laser beams cooperate to form a single weld pool so as to obtain a good mixing of the materials in the single weld pool, using the Gibbs-Marangoni effect. However, this method is not entirely satisfactory. In particular, it has a relatively low energy efficiency, and is therefore not adapted for welding two metal sheets having a gap between them.

Laser brazing is also known for joining two metal sheets together. However, this joining method is not adapted for obtaining, in the joining area, mechanical properties which are at least equal to the mechanical properties of the base material.

SUMMARY

One of the aims of the present disclosure is to overcome the above-drawbacks by proposing a method for butt laser welding two metal sheets arranged edge to edge resulting in an improved quality of the final product.

To this end, a method is provided for butt laser welding two metal sheets, the method comprising the following steps:
providing a first metal sheet and a second metal sheet, each metal sheet respectively having two main faces and a lateral face joining the two main face;
positioning the first and second metal sheets such that the lateral faces thereof face one another, the positioning of the first and second metal sheets defining a median plane perpendicular to the main faces of the first and second metal sheets; and
butt welding the first and second metal sheets along a direction of welding, the butt welding step comprising simultaneously emitting:
a first front laser beam along a first front emitting axis, the first front emitting axis intersecting one of the main faces of the first metal sheet, the first front laser beam creating a first front spot at the intersection with said main face of the first metal sheet, the energy density of the first front laser beam being greater than or equal to $10^6$ W/cm$^2$, the first front laser beam generating a first front keyhole in the first metal sheet at the first front spot;
a second front laser beam along a second front emitting axis, the second front emitting axis intersecting one of the main faces of the second metal sheet, the second front laser beam creating a second front spot at the intersection with said main face of the second metal sheet, the energy density of the second front laser beam being greater than or equal to $10^6$ W/cm$^2$, the second front laser beam generating a second front keyhole in the second metal sheet at the second front spot;
the center of each of the first and second front spots being located at a distance smaller than or equal to 2.5 mm from the lateral face of, respectively, the first metal sheet and the second metal sheet and the distance, taken along the direction of welding, between the centers of the first and second front laser beams being smaller than or equal to 5 mm; and
a back laser beam, the back laser beam intersecting adjacent main faces of the first and second metal sheets and creating a back spot thereon, the energy density of the back laser beam being greater than or equal to $10^6$ W/cm$^2$, the surface area of the back spot being greater than the surface area of each of the first and second front spots, the back laser beam generating a back keyhole in the first and second metal sheets at the back spot;
the first and second front laser beams and the back laser beam being configured in such a manner that:
the first and second front spots are located in front of the back spot; and such that:
at each moment in time, a solid phase region and/or a liquid phase region of the metal sheets remains between the first front keyhole and the back keyhole and between the second front keyhole and the back keyhole.

According to specific embodiments, the method according to the invention may further comprise one or more of the following features:
at each moment in time of the butt welding step, the volume of the melt bath created by the first and second front laser beams is separate from the volume of the melt bath created by the back laser beam;

the greatest dimension of the first and/or the second front spot is comprised between 50 μm and 250 μm;

the greatest dimension of the back spot is comprised between 200 μm and 1800 μm, preferably between 600 μm and 1200 μm;

the first metal sheet and the second metal sheet have respectively a thickness comprised between 0.15 mm and 5 mm;

the centers of the first and second front spots are located at an equal distance from the median plane between the first and second metal sheets;

the centers of the first and second front spots are aligned along a direction perpendicular to the direction of welding;

the centers of the first and second front spots are arranged at a distance from one another along the direction of welding;

the back spot is centered on the median plane between the first and second metal sheets;

the center of the back spot is laterally offset relative to the median plane between the first and second metal sheets;

the center of the back spot extends at a distance, taken along the direction of welding, comprised between 0.5 mm and 8 mm from the center of the rearmost among the first and the second front spots, and preferably at a distance comprised between 1 mm and 5 mm;

the first front spot and/or the second front spot has a Gaussian or top hat energy distribution, and, preferably, a circular contour;

the back spot has a Gaussian or top hat energy distribution;

the back spot is ring-shaped;

an outer dimension of the back spot taken perpendicularly to the direction of welding is smaller than an outer dimension of the back spot taken parallel to the direction of welding;

the back spot is symmetrical relative to a plane parallel to the median plane between the two metal sheets;

the greatest outer dimension of the back spot is comprised between 200 μm and 1800 μm, preferably between 600 μm and 1200 μm;

the ratio of the greatest outer dimension by the greatest inner dimension of the back spot is comprised between 1.2 and 3.2, preferably between 1.3 and 2;

the back spot has a circular contour or an elongated shape, along a direction of elongation parallel to the direction of welding;

the method further comprises, simultaneously with the step of emitting the first front laser beam, the second front laser beam and the back laser beam, emitting a secondary back laser beam, the secondary back laser beam intersecting adjacent main faces of the first and second metal sheets and creating a secondary back spot 36 thereon, the secondary back laser beam being configured in such a manner that the secondary back spot is located behind the back spot;

the secondary back spot is ring-shaped or has a Gaussian or top hat energy distribution;

the greatest outer dimension of the back spot is greater than the greatest outer dimension of the secondary back spot;

the method further comprises providing a welding material, for example a welding wire or powder, during the butt welding step;

the first and/or the second metal sheets comprises a steel substrate having a zinc-alloy or an aluminum-alloy precoating on at least one of its main faces;

the first front laser beam, and/or the second front laser beam, and/or the back laser beam are generated by a common laser head;

each laser beam is created by a dedicated laser head;

the steel substrate of at least one of first metal sheet or second metal sheet is a press-hardenable steel; and, the at least one of first metal sheet or second metal sheet comprises a zinc-containing or aluminum-containing precoating.

BRIEF DESCRIPTION OF THE DRAWINGS

Other aspects and advantages of the invention will appear upon reading the following description, given by way of example and made in reference to the appended drawings, wherein.

DETAILED DESCRIPTION

Figure 1:
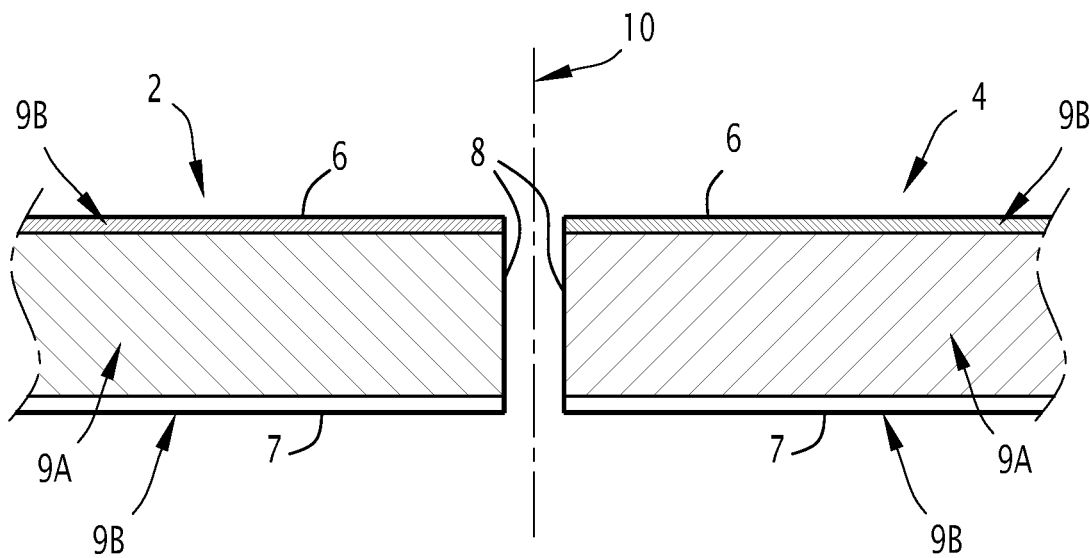
FIG. 1 is a schematic view in section of two metal sheets positioned according to a first embodiment of the method for butt welding two metal sheets.

A method for butt laser welding two metal sheets 2, 4 according to a first embodiment of the invention will be described in view of FIGS. 1 to 3.

The method comprises a step of providing a first metal sheet 2 and a second metal sheet 4.

Each metal sheet 2, 4 respectively has two main faces 6, 7 and a lateral face 8 joining the two main faces 6, 7.

The main faces 6, 7 are an upper face 6 and a lower face 7. The terms "upper" and "lower" are meant relative to an axis perpendicular to said main faces 6, 7.

The lateral face 8 of each metal sheet 2, 4 extends for example perpendicularly to the main faces 6, 7 of the metal sheet 2, 4. Alternatively, the lateral face 8 of at least one metal sheet 2, 4 does not extend perpendicular to the main faces 6, 7. For example, the lateral face 8 of at least one metal sheet 2, 4 is inclined with respect to the main faces 6, 7 of this metal sheet 2, 4 and forms with one of the main faces 6, 7 an angle distinct of 90°, and for example an angle greater than or equal to 45°, more particularly greater than or equal to 60°.

The first metal sheet 2 and the second metal sheet 4 have respectively a thickness comprised between 0.15 mm and 5 mm. By "thickness of a metal sheet", it is meant the distance between the main faces 6, 7 of the metal sheet 2, 4, taken perpendicularly to said main faces 6, 7.

Preferably, the first metal sheet 2 and the second metal sheet 4 respectively have a constant thickness. Alternatively, at least one of the first metal sheet 2 and the second metal sheet 4 has a variable thickness.

The first metal sheet 2 and the second metal sheet 4 have for example the same thickness. Alternatively, they have different thicknesses.

The first and/or the second metal sheets 2, 4 comprise(s) a steel substrate 9A.

The steel of the substrate 9A is more particularly a steel having a ferrito-perlitic microstructure.

Preferably, the substrate 9A is made of a steel intended for thermal treatment, more particularly a press-hardenable steel, and for example a manganese-boron steel, such as a 22MnB5 type steel.

Alternatively, the microstructure of the steel substrate 9A comprises bainite and/or ferrite and/or retained austenite.

The substrate may be obtained, depending on its desired thickness, by hot rolling and/or by cold-rolling followed by annealing, or by any other appropriate method.

The sheet 2, 4 for example comprises a zinc-containing or an aluminum-containing precoating 9B on at least one of the main faces of the substrate 9A, and for example on both of main faces thereof.

The method further comprises a step of positioning the first and second metal sheets 2, 4 for butt laser welding.

As illustrated on FIG. 1, the positioning is such that the lateral faces 8 of the first and second metal sheets 2, 4 face one another.

Figure 2:
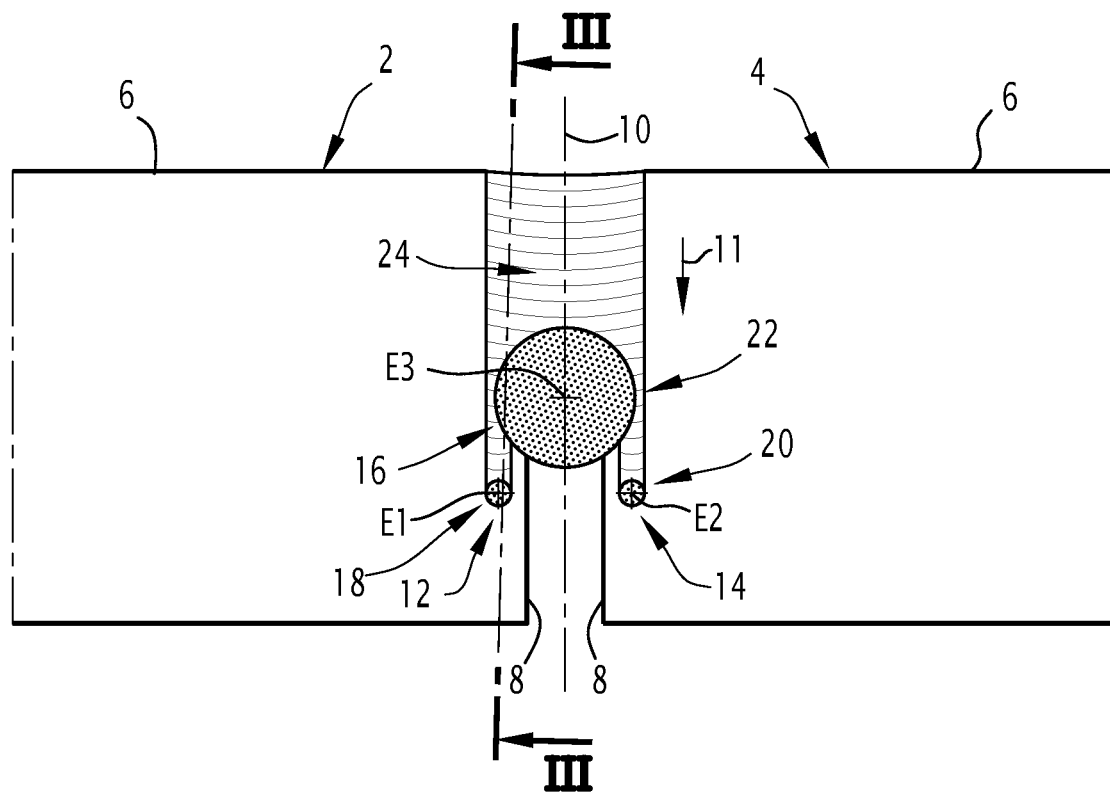
FIG. 2 is a schematic top view of the two metal sheets of FIG. 1 during the butt welding step of the method according to the first embodiment.

In the example shown in FIG. 2, there is at least one region of the first and second metal sheets 2, 4 in which the lateral faces 8 facing each other are positioned apart from each other. Alternatively, the first and second metal sheets 2, 4 are for example in contact over the entire area of their lateral faces 8. In another alternative, there is at least one region of the first and second metal sheets 2, 4 in which the lateral faces 8 are in contact with each other only over a portion of their thicknesses.

The main faces 6, 7 are positioned substantially parallel to one another. By "substantially parallel", it is meant that the main faces 6, 7 respectively define a first plane and a second plane, the first and second planes defining an angle between them of less than 1°.

The positioning defines a median plane 10 perpendicular to the main faces 6, 7 of the first and second metal sheets 2, 4. The median plane 10 is in particular a median plane between the lateral faces 8. The median plane 10 is preferably vertical.

The method then comprises a step of butt welding the first and second metal sheets 2, 4 along a direction of welding. The direction of welding in particular extends along the median plane 10. In FIG. 2, the arrow 11 indicates the direction of welding.

This step of butt welding comprises simultaneously emitting a first front laser beam 12, a second front laser beam 14 and a back laser beam 16.

The laser beams 12, 14, 16 are for example produced by a CO2 lasers, a YAG-Nd laser, a Fiber laser, a Disk laser or a Direct Diode laser. The different laser beams 12, 14, and 16 may be produced by the same type of laser or by different types of lasers.

In one embodiment, the first front laser beam 12 and the second front laser beam 14 and/or the back laser beam 16 are generated by a common laser head.

According to an alternative, each laser beam 12, 14, 16 is created by a dedicated laser head.

As a further alternative, two laser beams, for example two front laser beams 12, 14, are created by a common laser head and the third laser beam, for example the back laser beam 16, is created by a different laser head.

The direction of welding results from a relative displacement between the first and second metal sheets 2, 4 and the laser beams 12, 14, and 16.

The first front laser beam 12 is emitted along a first front emitting axis E1. The first front emitting axis E1 intersects one of the main faces 6, 7 of the first metal sheet 2. In the example illustrated on FIG. 2, said main face is an upper face 6 of the first metal sheet 2. Alternatively, said main face is a lower face 7 of the first metal sheet 2.

For example, the first front emitting axis E1 extends perpendicular to the main faces 6, 7 of the first metal sheet 2.

As illustrated on FIG. 2, the first front laser beam 12 creates a first front spot 18 at the intersection with said main face 6, 7 of the first metal sheet 2.

In particular, the first front laser beam 12 intersects said main face 6, 7 of the first metal sheet 2 over the entire cross section of the first front laser beam 12. Thus, all of the energy of the first front laser beam 12 is transmitted to the first metal sheet 2.

The energy density of the first front laser beam 12 is greater than or equal to $10^6$ W/cm². As a result, the first front laser beam 12 generates a first front keyhole 19 in the first metal sheet 2 at the first front spot 18 (see FIG. 3). In FIG. 3, the laser beams are not shown.

In this context, a keyhole is a cavity which extends into the thickness of the metal sheet, and contains vaporized material resulting from impact of the laser beam with the metal sheet. A keyhole allows for a direct transmission of the energy of the associated laser beam into the metal sheet.

Figure 3:
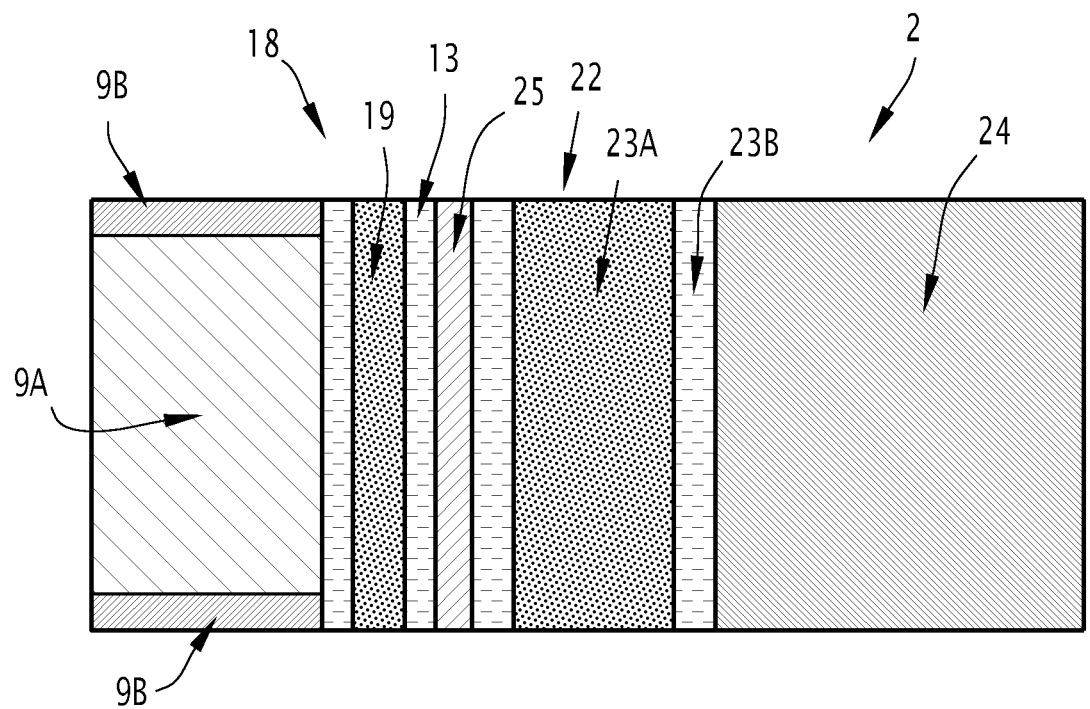
FIG. 3 is a schematic section of one of the two metal sheets of FIG. 2, according to the plane in FIG. 2.

As illustrated in FIG. 3, during the butt welding step, the first front laser beam 12 creates a first melt bath 13 at the location of the first front spot 18.

The first front keyhole 19 is surrounded by the first melt bath 13.

During the butt welding step, the pressure of the vapor contained within the first front keyhole 19 prevents the molten material of the first melt bath 13 from collapsing into the cavity formed by the keyhole.

In the example of FIG. 3, the first keyhole 19 is shown as a cylindrical cavity extending perpendicular to the main faces 6, 8 only for sake of simplicity. In practice, the first keyhole 19 can be inclined relative to the normal to the main faces 6, 8 with an angle which is proportional to the welding speed. Furthermore, the first keyhole 19 can have a variable cross section through the sheet thickness.

The second front laser beam 14 is emitted along a second front emitting axis E2.

The second front emitting axis E2 intersects one of the main faces 6, 7 of the second metal sheet 4. In the example illustrated on FIG. 2, said main face is an upper face 6 of the second metal sheet 4. Alternatively, said main face is a lower face 7 of the second metal sheet 4.

For example, the second front emitting axis E2 extends perpendicular to the main faces 6, 7 of the second metal sheet 4.

The second front laser beam 14 creates a second front spot 20 at the intersection with said main face 6, 7 of the second metal sheet 4.

In the example illustrated in FIG. 2, the first and second front spots 18, 20 are created on adjacent main faces 6, 7 of the first and second metal sheets 2, 4.

"Adjacent main faces" refer to one main face of the first metal sheet 2 and one main face of the second metal sheet 4 which are located on the same side of the metal sheets 2, 4 relative to the direction of emission of the laser beams. Thus, the first and second front spots 18, 20 are for example created on the upper faces 6 of the first and second metal sheets 2, 4, or on the lower faces 7 of the first and second metal sheets 2, 4.

In particular, the second front laser beam 14 intersects said main face 6, 7 of the second metal sheet 4 over the entire cross section of the second front laser beam 14. Thus, all of the energy of the second front laser beam 14 is transmitted to the second metal sheet 4.

The energy density of the second front laser beam 14 is greater than or equal to $10^6$ W/cm$^2$. As a result, the second front laser beam 14 generates a second front keyhole (not shown) on the second metal sheet 4 at the second front spot 20.

During the butt welding step, the second front laser beam 14 creates a second melt bath at the location of the second front spot 20. The second melt bath surrounds the second front keyhole.

For example, the volume of the first melt bath 13 is separated from the volume of the second melt bath, and, at least at one moment or at each moment in time of the butt welding step, the first melt bath 13 and the second melt bath are spaced apart from each other.

Alternatively, the volume of the first melt bath 13 is separated from the volume of the second melt bath, and, at least at one moment or at each moment in time of the butt welding step, a solid phase region of the metal sheets 2, 4 remains between the first melt bath 13 and the second melt bath.

Alternatively, the first and second melt baths are joined so as to form a single melt bath, at least at one moment of the butt welding step.

The greatest dimension of the first and/or the second front spot 18, 20 is comprised between 50 μm and 250 μm. Thus, the energy of the laser beams 12, 14 is transmitted to the metal sheets 2, 4 with a very high efficiency. In addition, these dimensions allow generating the first keyhole 19 and the second keyhole in the first and second metal sheets 2, 4 even with a comparatively low power input for the first and second laser beams 14, 16.

The first front spot 18 and/or the second front spot 20 have a Gaussian or top hat energy distribution, and, preferably, a circular contour.

The distance, taken along the direction of welding, between the centers of the first and second front laser beams 12, 14 is smaller than or equal to 5 mm.

In particular, in the method illustrated on FIG. 2, the centers of the first and second front spots 18, 20 are aligned along a direction perpendicular to the direction of welding.

The center of each of the first and second front spots 18, 20 are located at a distance smaller than or equal to 2.5 mm from the lateral face 8 of, respectively, the first metal sheet 2 and the second metal sheet 4.

In particular, in the method illustrated in FIG. 2, the centers of the first and second front spots 18, 20 are located at an equal distance from the median plane 10 between the first and second metal sheets 2, 4.

During the butt welding, the first and second front spots 18, 20 are spaced apart from each other. In other words, during butt welding, the first and second front spots 18, 20 do not overlap.

The back laser beam 16 is emitted along a back emitting axis E3.

The back laser beam 16 intersects adjacent main faces 6, 7 of the first and second metal sheets 2, 4. These adjacent main faces 6, 7 intersected by the back laser beam 16 are for example the two upper faces 6 of the first and second metal sheets 2, 4 or the two lower faces 7 of the first and second metal sheets 2, 4.

For example, the back emitting axis E3 extends perpendicular to the main faces 6, 7 of the first and second metal sheets 2, 4.

The back laser beam 16 creates a back spot 22 on said adjacent main faces 6, 7.

In the example illustrated in FIG. 2, the back spot 22 is created on the same main faces 6, 7 as the ones on which the first and second front spots 18, 20 are created. Alternatively, the back spot 22 is created on different main faces 6, 7 than the ones on which the first and second front spots 18, 20 are created.

The energy density of the back laser beam 16 is greater than or equal to $10^6$ W/cm$^2$. As a result, the back laser beam 16 generates a back keyhole 23A in the first and second metal sheets 2, 4 at the back spot 22 (see FIG. 3).

As illustrated in FIG. 3, during the butt welding step, the back laser beam 16 creates a back melt bath 23B at the location of the back spot 22. The back melt bath 23B surrounds the back keyhole 23A.

In an embodiment, the energy of the back laser beam 16 is greater than the respective energy of the first and second front laser beams 14, 16. For example, the energy of the back laser beam 16 is at least twice the respective energy of the first and second front laser beams 14, 16.

In the method according to the first embodiment, the back spot 22 has a Gaussian or top hat energy distribution.

In the example illustrated in FIG. 2, it has a circular contour.

As shown, the back spot 22 is centered on the median plane 10 between the first and second metal sheets 2, 4.

The greatest dimension of the back spot 22 is for example comprised between 200 μm and 1800 μm, preferably between 600 μm and 1200 μm.

As illustrated in FIG. 2, the surface area of the back spot 22 is greater than the surface area of each of the first and second front spots 18, 20. The volume of the back keyhole 23A created by the back laser beam 16 is greater than the volume of the first and second front keyholes respectively created by the first and second front laser beams 12, 14. In addition, during butt welding, the volume of the back melt bath 23B is greater than the volume of the first and second melt baths respectively created by the first and second front laser beams 12, 14.

During butt welding, the first and second front laser beams 12, 14 and the back laser beam 16 have a relative movement with respect to the first and second metal sheets 2, 4, such that the first and second front spots 18, 20 and the back spot 22 are displaced along the welding direction relatively to the first and second metal sheets 2, 4.

For example, the first and second front laser beams 12, 14 and the back laser beam 16 are moved together while the first and second metal sheets 2, 4 are fixed in position. Alternatively, the first and second front laser beams 12, 14 and the back laser beam 16 are fixed in position and the first and second metal sheets 2, 4 are moved together.

The laser welding creates a weld joint 24 at the junction of the two metal sheets 2, 4. The welding direction is defined as a direction extending along the median plane from a region in which the weld joint 24 has already been created towards a region in which the sheets 2, 4 have not yet been joint by the weld joint 24.

The first and second laser beams 12, 14 and the back laser beam 16 are configured in such a manner that the first and second front spots 18, 20 are located in front of the back spot 22.

In this context, "in front" means in front relative to the direction of welding. Therefore, the back spot 22 is located between the front spots 18, 20 and the weld joint 24 along the welding direction. In other words, during the butt welding step, a given region of the first and second metal sheets 2, 4 centered on the median plane 10 is always first intersected by the first and second front spots 18, 20 and then, later, intersected by the back spot 22.

During the butt welding, the back spot 22 is spaced apart from each of the first and second front spots 18, 20. In other words, during the butt welding, the back spot 22 does not overlap each of the first and second front spots 18, 20.

During the butt welding, the back keyhole 23A is spaced apart from the first front keyhole 19 and the second front keyhole. In other terms, during the butt welding, the back keyhole 23A does not overlap each of the first and second front keyholes.

For example, the relative geometrical disposition of the keyholes during butt welding may be monitored by visualizing the laser-material interaction zone via a 2D vision sensor. With an Infrared 2D vision sensor, a 2D temperature map of the interaction zone may be established. In particular, the keyholes, the melt baths, and the solid phase regions are clearly identified. Alternatively or additionally, it is possible to visualize the keyholes shapes with a 2D pure vision sensor, by illuminating the laser-material interaction zone with a dedicated wavelength of light, different from the welding laser, and using the corresponding pass band filter in front of the vision sensor.

The first and second front laser beams 12, 14 and the back laser beam 16 are configured in such a manner that, at each moment during the butt welding step, a solid phase region 25 and/or a liquid phase region 13, 23B of the metal sheets 2, 4 remains between the first front keyhole 19 and the back keyhole 23A and between the second front keyhole and the back keyhole 23A.

More particularly, the dimensions of the spots 18, 20, 22, the distances between the spots 18, 20, 22, the relative displacement speeds between the first and second front laser beams 12, 14 and of the back laser beam 16 and the metal sheets 2, 4, and the power densities of the beams 12, 14, 16 are configured such that, at each moment during the butt welding step, a solid phase region 25 and/or a liquid phase region 13, 23B of the metal sheets 2, 4 remains between the first front keyhole 19 and the back keyhole 23A and between the second front keyhole and the back keyhole 23A.

In the example shown in FIG. 3, a solid phase region 25 and a liquid phase region 13, 23B of the metal sheets 2, 4 remains between the first front keyhole 19 and the back keyhole 23A and between the second front keyhole and the back keyhole 23A. Alternatively, only a liquid phase region 13, 23B of the metal sheets 2, 4 remains between the first front keyhole 19 and the back keyhole 23A and between the second front keyhole and the back keyhole 23A.

In one embodiment, the first and second front laser beams 12, 14 and the back laser beam 16 are configured in such a manner that, at each moment during the butt welding step, the volume of the melt bath created by the first and second front laser beams 12, 14 is spaced apart from the volume of the melt bath created by the back laser beam 16. This embodiment decreases the variability of the welding and facilitates the numerical simulation thereof, compared to the case in which a single melt pool is formed by the front laser beams and the back laser beam.

The center of the back spot 22 extends at a distance, taken along the direction of welding, comprised between 0.5 mm and 8 mm from the center of the rearmost among the first and the second front spots 18, 20. This distance is preferably comprised between 1 mm and 5 mm.

The displacement speeds of the first and second front laser beams 12, 14 and of the back laser beam 16 are preferably identical and are comprised between 2 m/min and 20 m/min, preferably between 4 m/min and 12 m/min.

Examples of spots dimensions, distances between the spots, relative displacement speeds of the spots on the metal sheets 2, 4, and power densities of the beams will now be detailed.

According to a first example:
the first and second metal sheets 2, 4 respectively have a thickness of 1 mm and are positioned such that they are in contact with each other along the direction of welding or such that they are spaced apart from each other by a distance inferior to 80 μm;
the first and second front spots 18, 20 respectively have a diameter equal to 150 μm and an energy of 500 W, the first and second front spots 18, 20 being produced by a common laser welding head, this common laser welding head being powered by a Disk laser generator having a power of 1 kW and a wavelength of 1 μm;
the back spot 22 has a diameter equal to 600 μm and an energy of 4 kW, the back spot 22 being produced by a dedicated laser welding head, this dedicated laser welding head being powered by a YAG laser having a power of 4 kW and a wavelength of 1 μm;
the front spots 18, 20 and the back spot 22 are arranged in an equilateral triangle, such that the equilateral triangle has a side length of 1.2 mm, the back spot 22 being centered on the median plane and the front spots 18, 20 being located at an equal distance from the median plane, and;
the welding speed is 16 m/min.

According to a second example:
the first and second metal sheets 2, 4 respectively have a thickness of 1 mm and are positioned such that they are in contact with each other along the direction of welding or such that they are spaced apart from each other by a distance inferior to 80 μm;
the first and second front spots 18, 20 respectively have a diameter equal to 150 μm and an energy of 500 W, the first and second front spots 18, 20 being produced by a common laser welding head, this common laser welding head being powered by a Disk laser having a power of 1000 W and a wavelength of 1 μm;
the back spot 22 has a diameter equal to 600 μm and an energy of 4 kW, the back spot 22 being produced by a dedicated laser welding head, this dedicated laser welding head being powered by a YAG laser having a power of 4 kW and a wavelength of 1 μm;
the front spots 18, 20 being located at an equal distance from the median plane and being distant of 0.6 mm, the back spot 22 being centered on the median plane and located at a distance of 1.2 mm behind the front spots 18, 20, and;
the welding speed is 16 m/min.

In the method for butt laser welding the two metal sheets 2, 4 according to the present disclosure, the first and second front keyholes have a high shape ratio, the shape ratio being defined as the ratio of the height of the keyhole on the diameter of the keyhole. A keyhole with a high shape ratio absorbs a maximum of the laser beam energy by multiple reflections of the laser beam in the keyhole.

In particular, having a solid phase region 25 and/or a liquid phase region 13, 23B between the keyholes prevents the first and second front keyholes from opening out into the back keyhole 23A. Such a communication between the front and back keyholes would result in a high decrease of the respective shape ratios of the front keyholes and therefore affect the energy efficiency of the butt welding step.

In addition, during the butt welding, the first and second front laser beams 12, 14 respectively preheat considered areas of the first and second metal sheets 2, 4 before these areas are melted by the back spot 22.

This preheating is advantageous, as it increases the energy efficiency of the butt welding. In addition, it also results in a lengthening of the back melt bath 23B. Lengthening the back melt bath 23B improves the geometry of the weld joint 24, and increases the speed limit of the butt welding.

In addition, in the case where a coating is present on the steel sheets 2, 4, the first and second front laser beams 12, 14 act on the coating in the following ways: coatings with a low vaporization temperature, such as a zinc-based coating, are vaporized by the action of the first and second front laser beams 12, 14, while coating with high vaporization temperature, such as aluminum-based coatings, and for example aluminum-silicon coatings are pre-melted and partially incorporated in the fusion zone.

The respective energy densities of the first and second front spots 18, 20 allow for a very efficient preheating of the first and second metal sheets 2, 4. This efficiency is due to the first and second front keyholes which have a high shape ratio.

Furthermore, during the butt welding, the first and second front laser beams 12, 14 tend to decrease the gap between the first and second metal sheets 2, 4. More precisely, the width of the gap between the first and second metal sheets 2, 4 is decreased due to the thermal expansion of the steel substrate 9A, as well as to the surface tensions forces at the lateral faces 8, which tend to curve the edge profile of the lateral faces 8 and to move it closer to the median plane 10. This decrease in gap width results in an improvement of the energy efficiency of the back laser beam 16.

In an alternative of the method according to the first embodiment, the centers of the first and second front spots 18, 20 are arranged at a distance from one another along the direction of welding.

In another alternative of the method according to the first embodiment, the method comprises providing a welding material, for example a welding wire or powder, during the butt welding step.

The welding material is provided to the back laser beam 16, preferably by being inserted between the first and second front laser beams 12, 14. Alternatively the added welding material could be provided laterally or at back location of the back laser beam 16.

Inserting the welding material between the first and second front laser beams 12, 14 is facilitated in the case where the centers of the first and second front spots 18, 20 are arranged at a distance from one another along the direction of welding.

In the case where the welding material is a welding wire, the wire is for example inserted between the first and second front laser beams 12, 14 substantially parallel relative to the median plane 10.

When inserted between the first and second front laser beams 12, 14, the welding material is preheated by the first and second front laser beams 12, 14. When the welding material is inserted between the first and second front laser beams 12, 14, less than 20% of the volume of the welding material is melted by these laser beams 12, 14. Preferably, the first and second front laser beams 12, 14 do not melt the welding material when the welding material is inserted between them.

In this alternative, the lengthening of the back melt bath 23B due to the preheating of the metal sheets 2, 4 by the first and second front spots 18, 20 contributes to improving the mixing of the welding material with the material of the metal sheets 2, 4.

Alternatively to the method according to the first embodiment, the centers of the first and second front spots 18, 20 are located at different distances from the median plane 10.

In a further alternative of the method according to the first embodiment, the center of the back spot 22 is laterally offset relative to the median plane 10 between the first and second metal sheets 2, 4. This alternative is particularly suitable when the metal sheets 2, 4 have different thicknesses.

According to another alternative of the method according to the first embodiment, the back spot 22 has an elongated outer contour, for example an oblong contour, an elliptical contour, a rectangular contour, a tear drop contour or an ovoid contour. The oblong, tear drop and ovoid contours will be respectively described in greater detailed with reference to FIGS. 5, 6, 7.

A method for butt laser welding two metal sheets 2, 4 according to a second embodiment will be described in view of FIG. 4.

This method differs from the method according to the first embodiment in that the back spot 22 is ring-shaped.

The energy of the back laser beam 16 is mainly concentrated in an outer annular part rather than in its central part. Such a shape makes it easier to reach an energy density of $10^6$ W/cm$^2$.

In particular, by "ring-shaped", it is meant that the back spot 22 has an outer contour 26 and an inner contour 28. The inner contour 28 is substantially homothetic to the outer contour 26.

In particular, the back spot 22 is symmetrical relative to a plane parallel to the median plane 10 between the two metal sheets 2, 4.

Figure 4:
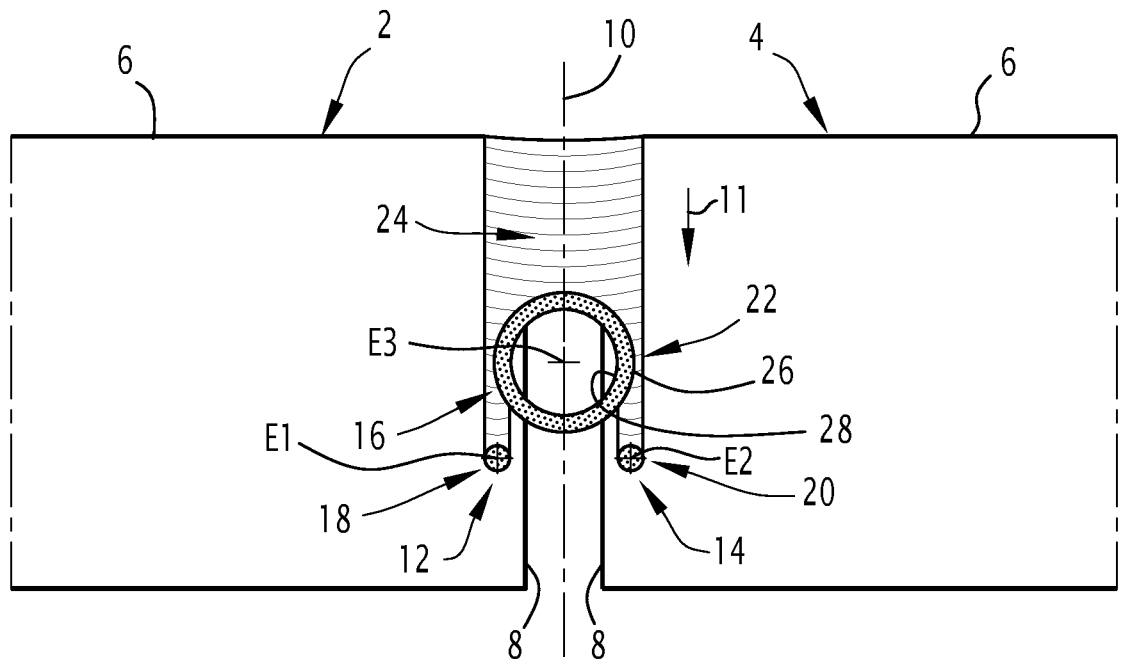
FIGS. 4 to 8 are schematic top views of two metal sheets during the butt welding step of a method for butt welding two metal sheets according to, respectively, a second, a third, a fourth, a fifth and a sixth embodiment.

As illustrated in FIG. 4, the back spot 22 is circular. More precisely, the outer contour 26 and the inner contour 28 of the back spot 22 are circular.

The greatest outer dimension of the back spot 22 is comprised between 200 µm and 1800 µm, preferably between 600 µm and 1200 µm. In the method according to the second embodiment, the greatest outer dimension of the back spot 22 corresponds to the diameter of its outer contour 26.

The ratio of the greatest outer dimension by the greatest inner dimension of the back spot 22 is comprised between 1.2 and 3.2, preferably between 1.3 and 2. In the second method, the greatest inner dimension of the back spot 22 corresponds to the diameter of its inner contour 28.

As illustrated in FIG. 4, at least one portion of the inner contour 28 respectively intersects the first and second metal sheets 2, 4.

The annular shape of the back laser beam 16 results in an increase of the energy efficiency of the method, since the portion of the energy of the back laser beam 16 which is wasted by passing in the gap between the lateral faces 8 is reduced.

A method for butt laser welding two metal sheets 2, 4 according to a third embodiment will be described in view of FIG. 5.

This method according to a third embodiment differs from the method according to a second embodiment in that the back spot 22 has an elongated shape, along a direction of elongation parallel to the direction of welding. In this case, an outer dimension of the back spot 22, taken perpendicularly to the direction of welding, is smaller than an outer dimension of the back spot 22, taken parallel to the direction of welding.

Figure 5:
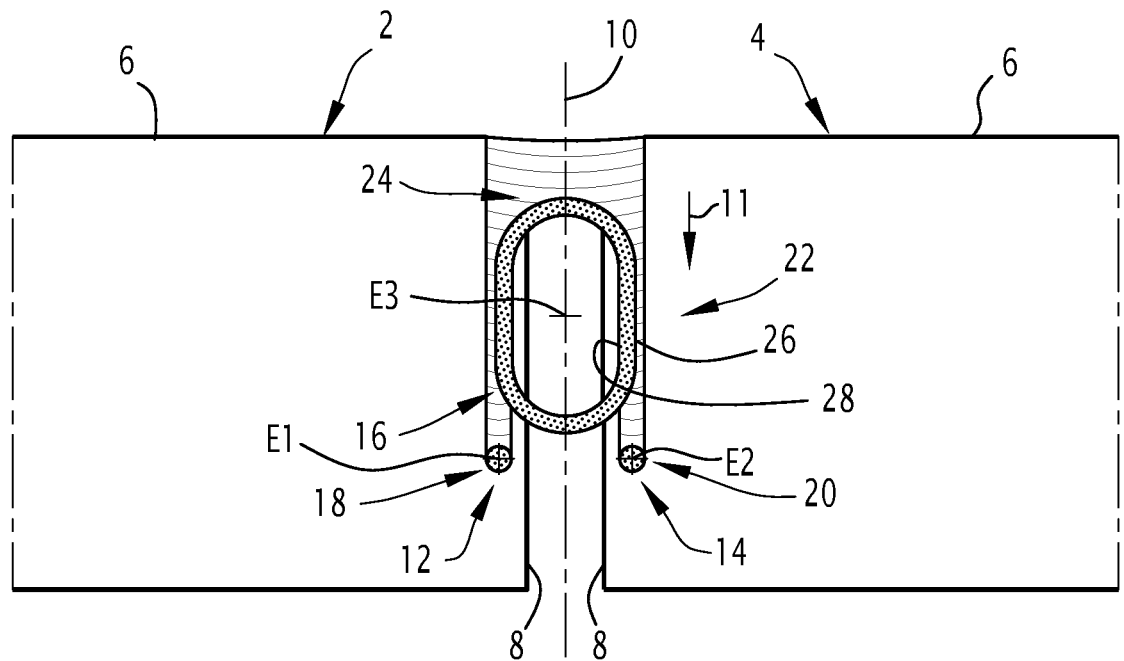

In the example illustrated in FIG. 5, the back spot 22 has an oblong shape. More precisely, the outer contour 26 and the inner contour 28 of the back spot 22 are oblong-shaped in the case of a ring-shaped back spot 22

The elongated shape improves the flow of melted material behind the back spot 22, the flow being less turbulent. Therefore, the elongated shape even further improves the geometry of the weld joint 24, and increases the speed limit of the butt welding.

According to an alternative, the back spot 22 has an elliptical shape. More precisely, the outer contour 26 and the inner contour 28 of the back spot 22 are elliptic in the case of a ring-shaped back spot 22.

According to another alternative, the back spot 22 has a rectangular contour. More precisely, the outer contour 26 and the inner contour 28 of the back spot 22 are rectangular in the case of a ring-shaped back spot 22.

A method for butt laser welding two metal sheets 2, 4 according to a fourth embodiment will be described in view of FIG. 6.

The method according to the fourth embodiment differs from the method according to the third embodiment in that the back spot 22 has a tear drop shape.

More precisely, the outer contour 26 and the inner contour 28 of the back spot 22 are tear drop shaped in the case of a ring-shaped back spot 22.

Figure 6:
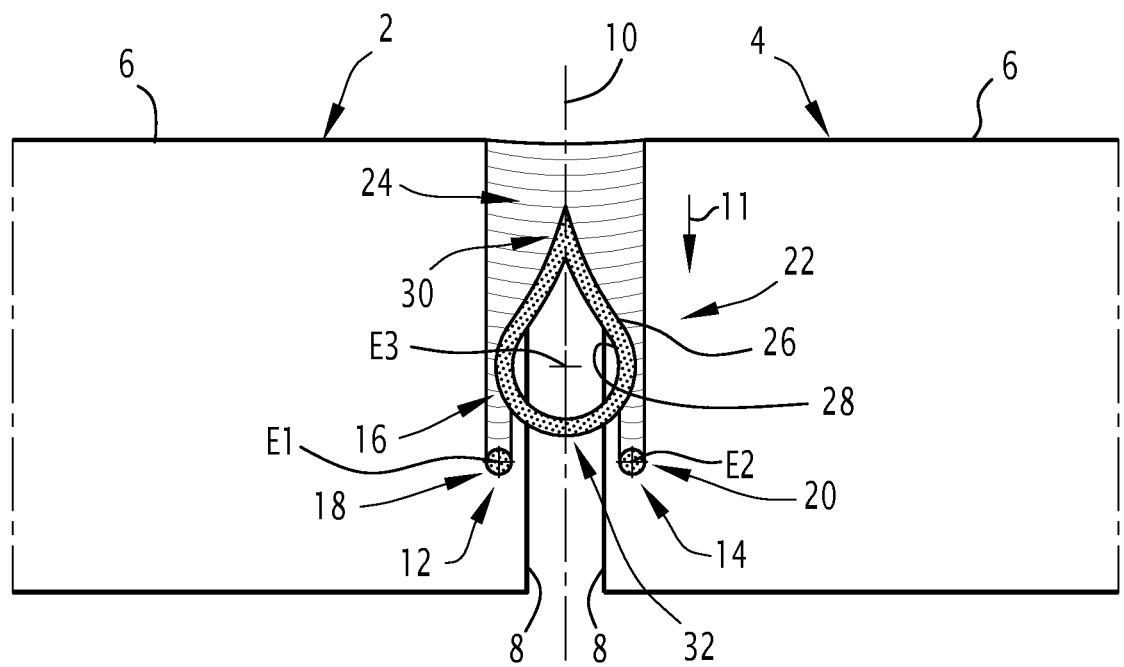

More particularly, as can be seen on FIG. 6, each of the outer and inner contours 26, 28 has a pointed end 30 opposing a rounded edge 32.

As illustrated in FIG. 6, the pointed end 30 is located behind the rounded edge 32 along the direction of welding.

The pointed end 30 is centered on the median plane 10.

A tear drop shape even further improves the flow of melted material behind the back spot 22.

Figure 7:
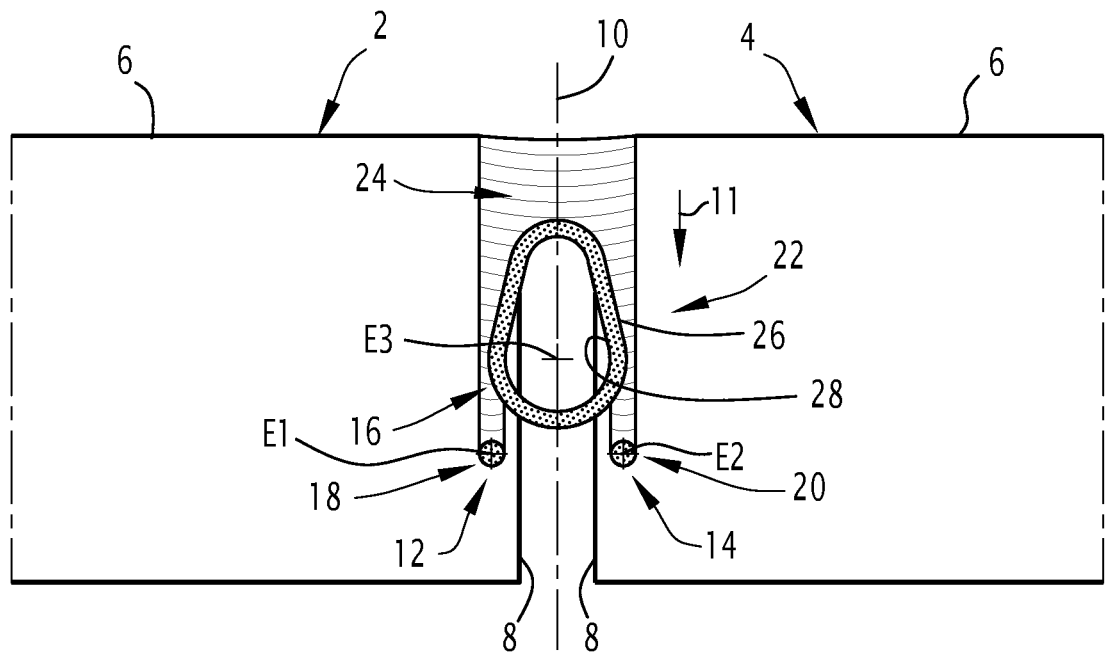

A method for butt laser welding two metal sheets 2, 4 according to a fifth embodiment will be described in view of FIG. 7.

The method according to the fifth embodiment differs from the method according to the third embodiment in that the back spot 22 has an ovoid shape.

A method for butt laser welding two metal sheets 2, 4 according to a sixth embodiment will be described in view of FIG. 8.

The method according to the sixth embodiment differs from the method according to the third embodiment in that it further comprises emitting a secondary back laser beam 34, simultaneously with the step of emitting the first front laser beam 12, the second front laser beam 14 and the back laser beam 16.

The secondary back laser beam 34 is emitted along a secondary back emitting axis E4.

The secondary back laser beam 34 intersects adjacent main faces 6, 7 of the first and second metal sheets 2, 4.

The secondary back laser beam 34 creates a secondary back spot 36 on said adjacent main faces 6, 7.

Figure 8:
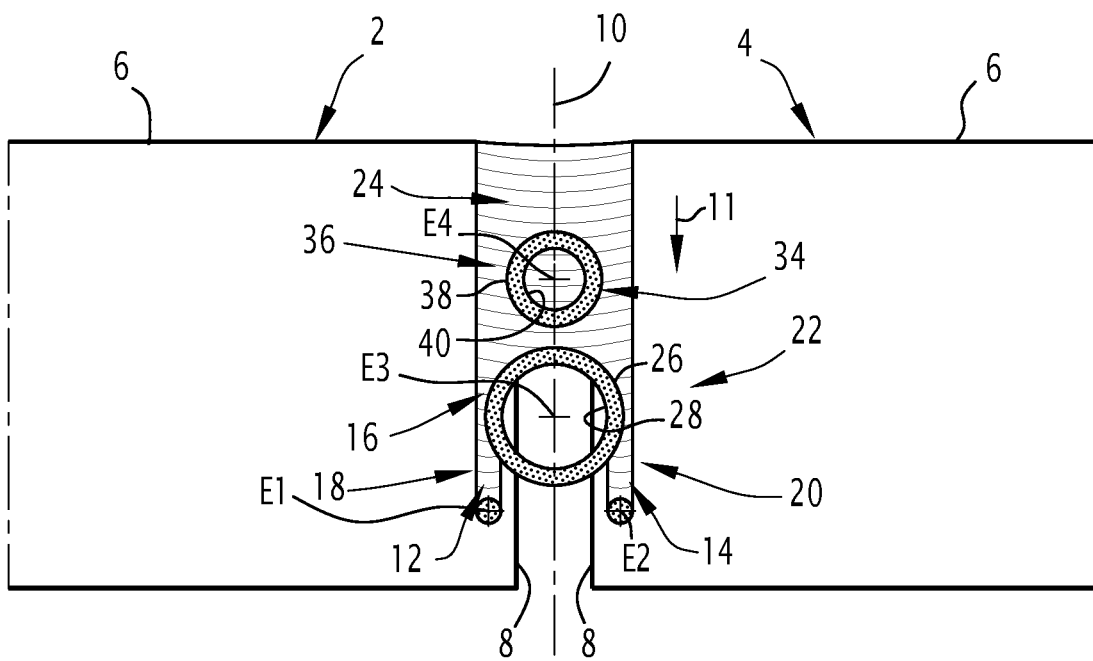

In the example illustrated in FIG. 8, the secondary back spot 36 is created on the same main faces 6, 7 than the ones on which the back spot 22 is created. Alternatively, the secondary back spot 36 is created on different main faces 6, 7 than the ones on which the back spot 22 is created.

The energy density of the secondary back laser beam 34 is preferably greater than or equal to $10^6$ W/cm². As a result, the secondary back laser beam 34 generates a secondary back keyhole in the first and second metal sheets 2, 4 at the secondary back spot 36.

Alternatively, the energy density of the secondary back laser beam 34 is lower than $10^6$ W/cm², therefore producing a non-keyhole heating enhancing the smoothness of the weld joint 24.

The secondary back spot 36 is symmetrical relative to a plane parallel to the median plane 10 between the two metal sheets 2, 4.

In particular, the secondary back spot 36 is circular. More precisely, the outer contour 38 and the inner contour 40 of the secondary back spot 36 are circular.

The greatest outer dimension of the back spot 22 is greater than the greatest outer dimension of the secondary back spot 36.

The greatest dimension of the secondary back spot 36 is for example comprised between 100 μm and 1300 μm, preferably between 300 μm and 1000 μm.

On the example of FIG. 8, the secondary back spot 36 is centered on the median plane 10.

During the butt welding, the secondary back laser beam 34 is configured in such a manner that the secondary back spot 36 is located behind the back spot 22, along the direction of welding. The secondary back spot 36 is in particular located between the back spot 22 and the weld joint 24 along the direction of welding.

During the butt welding step, the secondary back laser beam 34 creates a secondary back melt bath, the secondary back melt bath being in particular created at the location of the secondary back spot 36.

For example, the back melt bath 23B and the secondary back melt bath are joined. Alternatively, the volume of the back melt bath 23B is separated from the volume of the secondary back melt bath, and at each moment in time of the butt welding step, a solid phase region of the metal sheets 2, 4 remains between the back melt bath 23B and the secondary back melt bath.

In the example illustrated in FIG. 8, the secondary back spot 36 is ring-shaped. The secondary back spot 36 in particular has an outer contour 38 and an inner contour 40. The inner contour 40 of the secondary back spot 36 is sensibly homothetic to the outer contour 38 of the secondary back spot 36.

According to an alternative, the secondary back spot 36 has a Gaussian or top hat energy distribution.

According to another alternative, the secondary back spot 36 has an elongated shape, for example an oblong shape, an ovoid shape, a rectangular shape, or a tear drop shape.

In a further alternative, the center of the secondary back spot 36 is laterally offset relative to the median plane 10 between the between the first and second metal sheets 2, 4.

Thanks to the above disclosed features, the method of butt welding according to the invention present disclosure makes it possible to weld metal sheets 2, 4 with a good energy efficiency even if the metal sheets are positioned with an important gap between them.

What is claimed is:

1. A method for butt laser welding two metal sheets, the method comprising:
   providing a first metal sheet and a second metal sheet, the first and second metal sheets each respectively having two main faces and a lateral face joining the two main faces;
   positioning the first and second metal sheets such that the lateral faces thereof face one another, the positioning of the first and second metal sheets defining a median plane perpendicular to the main faces of the first and second metal sheets; and butt welding the first and second metal sheets along a direction of welding, the butt welding comprising simultaneously emitting:
  a first front laser beam along a first front emitting axis, the first front emitting axis intersecting one of the two main faces of the first metal sheet, the first front laser beam creating a first front spot at the intersection with said main face of the first metal sheet, an energy density of the first front laser beam being greater than or equal to $10^6$ W/cm$^2$, the first front laser beam creating a first front melt bath only on the first metal sheet, the first front laser beam generating a first front keyhole in the first metal sheet at the first front spot;
  a second front laser beam along a second front emitting axis, the second front emitting axis intersecting one of the two main faces of the second metal sheet, the second front laser beam creating a second front spot at the intersection with said main face of the second metal sheet, an energy density of the second front laser beam being greater than or equal to $10^6$ W/cm$^2$, the second front laser beam creating a second front melt bath only on the second metal sheet, the second front laser beam generating a second front keyhole in the second metal sheet at the second front spot, a center of each of the first and second front spots being located at a distance smaller than or equal to 2.5 mm from the lateral face of, respectively, the first metal sheet and the second metal sheet and the distance, taken in projection on the direction of welding, between the centers of the first and second front laser beams being smaller than or equal to 5 mm; and
  a back laser beam, the back laser beam intersecting the main faces of the first and second metal sheets that are adjacent to each other and creating a back spot thereon, an energy density of the back laser beam being greater than or equal to $10^6$ W/cm$^2$, a surface area of the back spot being greater than a surface area of each of the first and second front spots, the back laser beam generating a back keyhole in the first and second metal sheets at the back spot;
the first and second front laser beams and the back laser beam being configured in such a manner that:
  the first and second front spots are located in front of the back spot; and such that:
  at each moment in time, a solid phase region and a liquid phase region of the metal sheets remains between the first front keyhole and the back keyhole and between the second front keyhole and the back keyhole, and
  at each moment in time, a volume of the first front melt bath created by the first front laser beam and a volume of the second front melt bath created by the second front laser beam are each separate from a volume of a back melt bath created by the back laser beam.

2. The method according to claim 1, wherein a greatest dimension of the first and/or the second front spot is between 50 µm and 250 µm.

3. The method according to claim 1, wherein a greatest dimension of the back spot is between 200 µm and 1800 µm.

4. The method according to claim 1, wherein the first metal sheet and the second metal sheet each have respectively a thickness between 0.15 mm and 5 mm.

5. The method according to claim 1, wherein the centers of the first and second front spots are located at an equal distance from the median plane between the first and second metal sheets.

6. The method according to claim 1, wherein the centers of the first and second front spots are aligned along a direction perpendicular to the direction of welding.

7. The method according to claim 1, wherein, taken in projection on the direction of welding, the centers of the first and second front spots are arranged offset from one another.

8. The method according to claim 1, wherein the back spot is centered on the median plane between the first and second metal sheets.

9. The method according to claim 1, wherein the center of the back spot is laterally offset relative to the median plane between the first and second metal sheets.

10. The method according to claim 1, wherein the center of the back spot extends at a distance, taken along the direction of welding, between 0.5 mm and 8 mm from the center of a rearmost one of the first and the second front spots.

11. The method according to claim 1, wherein the first front spot and/or the second front spot has a Gaussian or top hat energy distribution.

12. The method according to claim 1, wherein the back spot has a Gaussian or top hat energy distribution.

13. The method according to claim 1, wherein the back spot is ring-shaped.

14. The method according to claim 13, wherein an outer dimension of the back spot taken perpendicularly to the direction of welding is smaller than an outer dimension of the back spot taken parallel to the direction of welding.

15. The method according to claim 13, wherein the back spot is symmetrical relative to a plane parallel to the median plane between the two metal sheets.

16. The method according to claim 13, wherein a greatest outer dimension of the back spot is between 200 µm and 1800 µm.

17. The method according to claim 13, wherein a ratio of a greatest outer dimension by a greatest inner dimension of the back spot is between 1.2 and 3.2.

18. The method according to claim 1, wherein the back spot has a circular contour or an elongated shape, wherein the elongated shape is elongated along a direction of elongation parallel to the direction of welding.

19. The method according to claim 1, further comprising, simultaneously with the emitting of the first front laser beam, the second front laser beam and the back laser beam, emitting a secondary back laser beam, the secondary back laser beam intersecting the main faces of the first and second metal sheets that are adjacent to each other and creating a secondary back spot thereon, the secondary back laser beam being configured in such a manner that the secondary back spot is located behind the back spot.

20. The method according to claim 19, wherein the secondary back spot is ring-shaped or has a Gaussian or top hat energy distribution.

21. The method according to claim 19, wherein a greatest outer dimension of the back spot is greater than a greatest outer dimension of the secondary back spot.

22. The method according to claim 1, wherein the method further comprises providing a welding material during the butt welding.

23. The method according to claim 1, wherein the first and/or the second metal sheets comprises a steel substrate having a zinc-alloy or an aluminum-alloy precoating on at least one of the two main faces.

24. The method according to claim 1, wherein the first front laser beam, and/or the second front laser beam, and/or the back laser beam are generated by a common laser head.

25. The method according to claim 1, wherein the first front laser beam, the second front laser beam and the back laser beam are respectively created by three distinct laser heads.

26. The method according to claim 1, wherein the steel substrate of at least one of first metal sheet or second metal sheet is a press-hardenable steel.

27. The method according to claim 1, wherein the at least one of first metal sheet or second metal sheet comprises a zinc-containing or aluminum-containing precoating.

28. The method according to claim 3, wherein the greatest dimension of the back spot is between 600 µm and 1200 µm.

29. The method according to claim 10, wherein the center of the back spot extends at a distance, taken along the direction of welding between 1 mm and 5 mm from the center of the rearmost among the first and the second front spots.

30. The method according to claim 11, wherein the first front spot and/or the second front spot has a circular contour.

31. The method according to claim 16, wherein the greatest outer dimension of the back spot is between 600 µm and 1200 µm.

32. The method according to claim 17, wherein the ratio of the greatest outer dimension by the greatest inner dimension of the back spot is between 1.3 and 2.

33. The method according to claim 22, wherein the welding material is a welding wire or powder.

34. The method according to claim 1, wherein the first and second metal sheets are positioned at a non-zero distance to one another to form a gap between them, the distance being inferior to 80 µm.

35. The method according to claim 34, wherein the first and/or the second metal sheets comprises a steel substrate; and wherein, during the butt welding, the first and second front laser beams decrease the gap between the first and second metal sheets, due to the thermal expansion of the steel substrate and the surface tensions forces at the lateral faces.

36. The method according to claim 1, wherein the first front emitting axis extends perpendicular to the main faces of the first metal sheet, and/or the second front emitting axis extends perpendicular to the main faces of the second metal sheet, and/or the back laser beam is emitted along a back emitting axis extending perpendicular to the main faces of the first and second metal sheets.

* * * * *